United States Patent Office 2,765,821
Patented Oct. 9, 1956

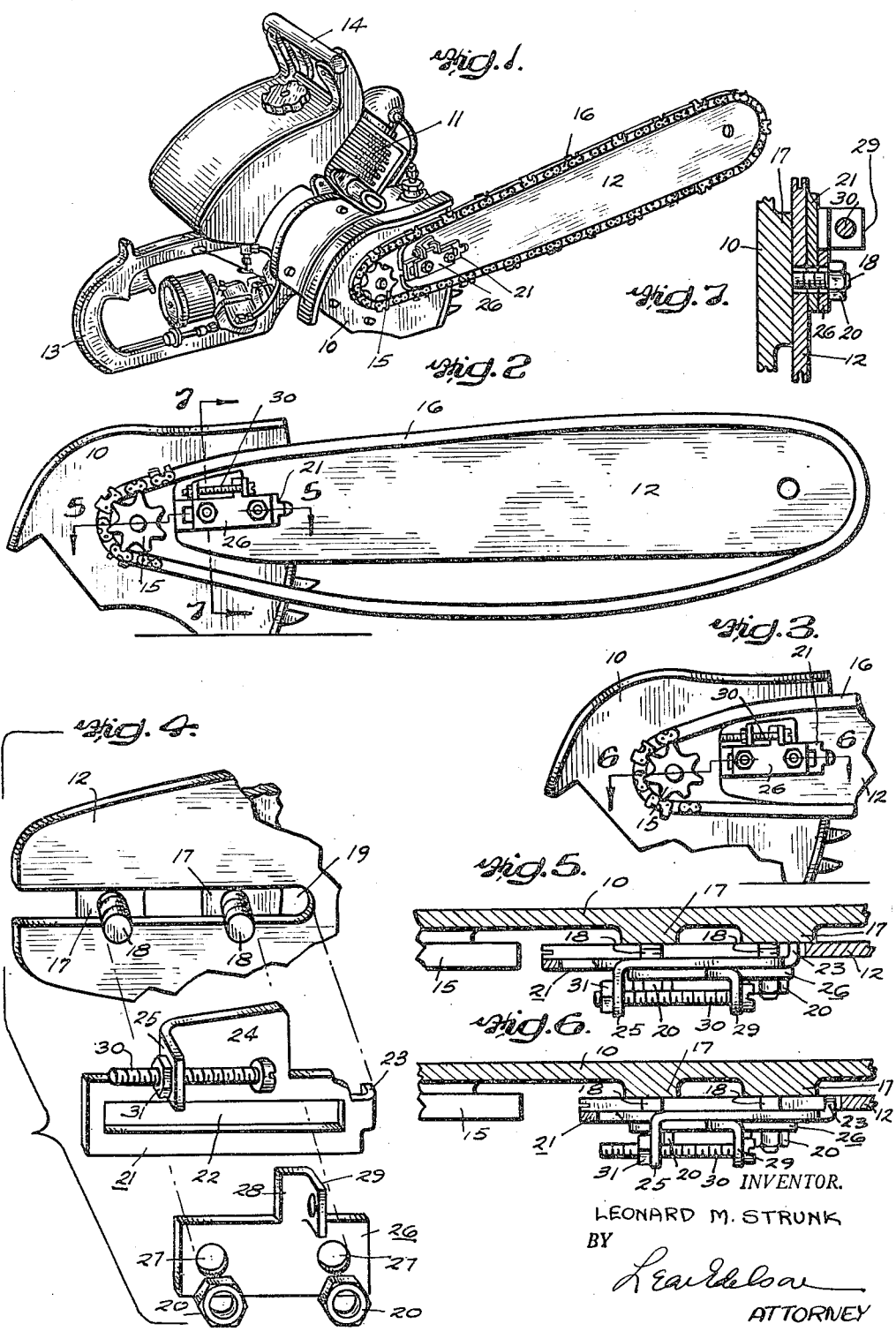

2,765,821

CHAIN SAW BLADE TENSIONING MEANS

Leonard M. Strunk, Coatesville, Pa.

Application June 30, 1954, Serial No. 440,320

2 Claims. (Cl. 143—32)

This invention relates generally to saws and is concerned more particularly with improvements in power driven saws of that kind known in the lumber and logging industries as "chain saws."

A principal object of the present invention is to provide such a power driven saw with chain tensioning means in the form of a take-up device which is a separate unitary attachment the operative mounting of which requires no substantial modification of the saw.

Another object of the present invention is to provide an attachment as aforesaid which is exceedingly simple in design and construction and which is comparatively simple and inexpensive to manufacture.

Other objects and advantages of the present invention will appear more fully hereinafter, it being understood that said invention consists substantially in the combination, construction, location and general arrangement of parts, all as described in detail in the following specification, as shown in the accompanying drawing and as fully pointed out in the appended claims.

In the accompanying drawings:

Figure 1 is a perspective view of a power driven saw embodying the present invention;

Figure 2 is an elevation of the power driven saw of Figure 1 showing the saw chain loosely trained over the drive sprocket and saw blade;

Figure 3 is a fragmentary elevation similar to Figure 2 showing the saw chain trained over the drive sprocket and saw blade and properly tensioned;

Figure 4 is an exploded view showing the parts of the take-up device ready for assembly with the saw blade and the power saw frame;

Figure 5 is an enlarged horizontal section on line 5—5 of Figure 2;

Figure 6 is an enlarged horizontal section on line 6—6 of Figure 3; and

Figure 7 is an enlarged vertical section on line 7—7 of Figure 2.

Referring to the drawings, a power saw embodying the present invention comprises a frame 10 which carries an engine 11 and a laterally extending saw blade or bar 12. The frame 10 is provided with a pair of handles 13 and 14 through the medium of which the operator may hold the power saw in any desired working position. The engine 11 is conventionally mounted on the frame 10 and is operable through suitable power transmission means (not shown) to drive a chain sprocket 15 disposed at one end of the frame 10 and in the plane of and adjacent to the inner end portion of the saw blade 12. An endless saw chain 16 is trained about the chain sprocket 15 and the peripheral edge of the saw blade 12 as is well known in the art.

For rigidly adjustably securing the saw blade 12 to the frame 10, the frame 10 is provided with a pair of bosses 17—17 which underlie the inner end portion of the saw blade 12. A pair of studs 18—18 extend respectively from the bosses 17—17 in mutually parallel spaced relation and project neatly through a longitudinally extending open slot 19 in the inner end portion of the saw blade 12. A pair of nuts 20—20 are threaded respectively on the studs 18—18, there being interposed between the saw blade 12 and the nuts 20—20 certain parts of a take-up device which is to be described. When the nuts 20—20 are tightened, the saw blade 12 is rigidly adjustably secured in fixed relation to the frame 10.

For adjustably shifting the saw blade 12 relative to the chain sprocket 15 to furnish the chain saw 16 with more or less slack, there is provided a take-up device which includes a shiftable rigid plate member 21 having a generally rectangular main body part in which there is formed an elongated slot 22. The plate member 21 is provided with a terminal portion integral with the main body part and turned out of the plane thereof to form a lug 23. The plate member 21 is provided additionally with a planar extension 24 of the main body part, and the latter is provided with an integral portion turned out of the plane of the main body part to form a lug 25. The lugs 23 and 25 extend laterally from the main body part in opposite directions and are disposed respectively in parallel spaced planes.

The plate member 21 is carried by the studs 18—18 and is mounted with the studs 18—18 projecting neatly through the slot 22, the length of the latter being sufficient for substantial planar shifting movement of the plate member 21. When fully mounted upon the studs 18—18, the plate member 21 is disposed in side abutting relation to the saw blade 12 with the lug 23 presenting toward the saw blade 12 and projecting into the slot 22 at the closed end of the latter, and with the lug 25 presenting away from the saw blade 12.

The take-up device includes additionally a stationary rigid plate member 26 having a generally rectangular main body part which is apertured as at 27—27. The plate member 26 is provided with a planar extension 28 of the main body part, and the latter is provided with an integral portion turned out of the plane of the main body part to form a laterally extending lug 29.

The stationary plate member 26 is carried by the studs 18—18 and is mounted with the latter respectively projecting through the apertures 27—27. When fully mounted upon the studs 18—18, the stationary plate member 26 is disposed in side abutting relation to the shiftable plate member 21 with the lug 29 of the stationary member 26 presenting away from the shiftable plate member 21 and disposed in opposed parallel relation to the lug 25 of the shiftable plate member 21.

For shifting the plate member 21 relative to the stationary plate member 26, an adjusting screw 30 is provided. The screw 30 is slidably projected through the lug 29 of the stationary plate member 26 and threadedly projected through the lug 25 of the shiftable plate member 21, the slotted head of the screw 30 being disposed in abutting relation to the lug 29 while a lock nut 31 is disposed in abutting relation to the lug 25.

Referring particularly to Figure 2, the saw chain 16 is shown trained about the chain sprocket 15 and the peripheral edge of the saw blade 12 with an excessive amount of slack in the saw chain 16. The lug 23 of the shiftable plate member 21 is shown positioned as close as possible to the closed rounded end of the slot 19, in effect abutting the same. The lug 25 of the slidable plate member 26 is shown engaged with a portion of the adjusting screw 30 disposed a substantial distance from the lug 29 of the stationary plate member 26.

The desired tensioning of the saw chain 16 is effected by first loosening the nuts 20—20 which are threaded on the studs 18—18, and then turning the adjusting screw 30 to thread the same farther into the lug 25 of the shiftable plate member 21. As the screw 30 is turned, the plate member 21 is shifted in its plane relative to the stationary plate member 26, as a consequence of which the saw blade 12 is correspondingly shifted outwardly in its plane by the lug 23 of the shiftable plate member 21.

Referring particularly to Figure 3, the plate member 21 and the saw blade 12 may be shifted outwardly together within the limit of the slot 22 in the plate member 21 an amount sufficient to take up the slack in the saw chain 16, whereupon the nuts 20—20 and 31 are again tightened.

Removal of the saw chain 16 is effected by first loosening the nuts 20—20 and 31 and then turning the adjusting screw 30 to back the same part way out of the lug 25 of the shiftable plate member 21. As the screw 30 is turned, the plate member 21 is shifted in its plane relative to the stationary plate member 26 and the saw blade 12, the lug 23 of the shiftable plate member 21 being shifted correspondingly away from the closed rounded end of the slot 19 in the saw blade 12. The saw blade 12 is then manually shifted in its plane inwardly to a position wherein the lug 23 of the shiftable plate member 21 again abuts the closed rounded end of the slot 19 in the saw blade 12, whereupon there is developed sufficient slack in the saw chain 16 to facilitate removal of the same.

Having removed the saw chain 16, the operator may detach the saw blade 12 from the frame 10 by manually shifting the saw blade 12 outwardly in its plane a distance sufficient for disengaging the same from the studs 18—18.

It should now be apparent that the take-up device essentially comprising the shiftable plate member 21, the stationary plate member 26 and the adjusting screw 30 is a separate unitary attachment the mounting of which requires no substantial modification of the saw. It should be apparent additionally, that the take-up device is exceedingly simple in design and construction and comparatively simple and inexpensive to manufacture.

It will be understood, of course, that the present invention is susceptible of various changes and modifications which may be made from time to time without involving any departure from the general principles or real spirit thereof. For example, the slot 22 in the saw blade 12 could be closed at both ends instead of only at one end, and the lug 23 of the shiftable plate member 21 could be arranged to extend around and abut the inner terminal edge of the saw blade 12 instead of being projected into the slot 22 in the saw blade 12. In addition, the studs 18—18 could be replaced by bolts threaded into the frame 10. Accordingly, it is intended to claim the same broadly, as well as specifically as indicated in the appended claims.

What is claimed as new and useful is:

1. In a power driven saw, a frame, a revoluble chain sprocket carried by said frame, an elongated saw blade mounted on said frame in coplanar relation to said sprocket and shiftable in its plane relative to said frame and sprocket, one end portion of said blade being disposed in side abutting relation to said frame adjacent to said sprocket and being provided with an open-ended slot extending longitudinally of said blade, a saw chain trained about said sprocket and blade, and a take-up device for tensioning said saw chain, said device comprising a shiftable plate member disposed in side abutting relation to said blade, said shiftable plate member having an elongated slot therein with closed ends, said slot being in longitudinal registry with the open-ended slot of said blade, a stationary plate member disposed in side abutting relation to said shiftable plate member having spaced apertures in registry with said slots, said frame being provided with spaced threaded means projected through said registering slots and apertures for releasably securing said plate members and blade to said frame, and an axially movable member interconnecting said plate members and operable upon release of said plate members and blade for shifting said shiftable plate member relatively to said stationary member, said shiftable plate member being provided with an element which projects laterally therefrom into and engages the closed end of said open-ended slot in said blade in line with and forwardly of said spaced threaded means for shifting said blade correspondingly therewith to a selected chain tensioning position, the arrangement of the take-up device and its mounting upon the frame being such as to permit complete removal of the blade from the frame simply upon release of said plate members from tight securement against the blade and its supporting frame, and said shiftable plate slot cooperating with said threaded means for limiting the shifting movement of said shiftable plate and blade in response to said axially movable member.

2. In a power driven saw, a frame, a revoluble chain sprocket carried by said frame, an elongated saw blade mounted on said frame in coplanar relation to said sprocket and shiftable in its plane relative to said frame and sprocket, one end portion of said blade being disposed in side abutting relation to said frame adjacent to said sprocket and being provided with an open-ended slot extending longitudinally of said blade, a saw chain trained about said sprocket and blade, and a take-up device for tensioning said saw chain, said device comprising a shiftable plate member disposed in side abutting relation to said blade, said shiftable plate member having an elongated slot therein with closed ends, said slot being in longitudinal registry with the open-ended slot of said blade, a stationary plate member disposed in side abutting relation to said shiftable plate member having spaced apertures in registry with said slots, said frame being provided with a pair of spaced studs which project through said registering slots and said apertures for releasably removably securing said plate members and blade to said frame, and an adjusting screw which connects said plate members and which is operable upon release of said plate members and blade for shifting said shiftable plate member relatively to said stationary plate member, said shiftable plate member being provided with an integral lug which projects laterally therefrom into and engages the closed end of said open-ended slot in said blade in line with and forwardly of said spaced studs for shifting said blade correspondingly therewith to a selected chain tensioning position, the arrangement of the take-up device and its mounting upon the frame being such as to permit complete removal of the blade from the frame by endwise shifting of the blade in its plane simply upon release of said plate members from tight securement against the blade and its supporting frame, and said shiftable plate slot cooperating with said studs for limiting the shifting movement of said shiftable plate and blade in response to said adjusting screw.

References Cited in the file of this patent
UNITED STATES PATENTS

| | | |
|---|---|---|
| 2,348,588 | Arsneau | May 9, 1944 |
| 2,370,556 | Mall | Feb. 27, 1945 |
| 2,618,298 | Pratt | Nov. 18, 1952 |
| 2,624,379 | Arneson | Jan. 6, 1953 |